US010216833B2

United States Patent
Kannan et al.

(10) Patent No.: US 10,216,833 B2
(45) Date of Patent: Feb. 26, 2019

(54) ASSOCIATING CONTENT ITEMS WITH DOCUMENT SECTIONS

(71) Applicant: Microsoft Corporation, Redmond, WA (US)

(72) Inventors: Anitha Kannan, Mountain View, CA (US); Krishnaram Kenthapadi, Sunnyvale, CA (US); Marios Kokkodis, New York, NY (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1001 days.

(21) Appl. No.: 14/481,946

(22) Filed: Sep. 10, 2014

(65) Prior Publication Data

US 2016/0070782 A1    Mar. 10, 2016

(51) Int. Cl.
*G06F 7/00* (2006.01)
*G06F 17/30* (2006.01)

(52) U.S. Cl.
CPC .. *G06F 17/30657* (2013.01); *G06F 17/30011* (2013.01); *G06F 17/30014* (2013.01); *G06F 17/3053* (2013.01); *G06F 17/3082* (2013.01); *G06F 17/30675* (2013.01)

(58) Field of Classification Search
CPC ........................ G06F 17/241; G06F 17/30014
See application file for complete search history.

(56) References Cited

U.S. PATENT DOCUMENTS

| 8,434,001 | B2 | 4/2013 | Kandekar et al. | |
| 8,698,765 | B1 | 4/2014 | Keller | |
| 2011/0078147 | A1* | 3/2011 | Klinkner | G06Q 30/02 707/740 |
| 2011/0320429 | A1 | 12/2011 | Doig et al. | |
| 2013/0145241 | A1* | 6/2013 | Salama | G06F 17/211 715/202 |
| 2013/0232409 | A1 | 9/2013 | Cranfill et al. | |

(Continued)

OTHER PUBLICATIONS

Agrawal, et al., "Data Mining for Improving Textbooks", In Newsletter ACM SIGKDD Explorations Newsletter Archive vol. 13 Issue 2, May 5, 2012, pp. 7-19.

(Continued)

*Primary Examiner* — Charles E Lu
(74) *Attorney, Agent, or Firm* — Goff IP Law PLLC; Jared S. Goff

(57) ABSTRACT

A document such as a book or textbook includes multiple sections such as chapters. Concept phrases are determined for each of the sections based on the text of each section. A set of content items such as videos is received, and each content item is associated with one or more queries that were submitted by users who were provided the content item in a set of search results. These queries are processed to determine concept phrases that are associated with the content items. The content items and their associated concept phrases are compared with the concept phrases associated with the sections to determine, for some or all of the content items, a minimum subset of the sections whose associated concept phrases cover most of the concept phrases that are associated with the content item. The content items are inserted or linked with the sections in their corresponding minimum subsets.

20 Claims, 5 Drawing Sheets

(56) References Cited

U.S. PATENT DOCUMENTS

2014/0089775 A1    3/2014   Worsley et al.
2014/0173441 A1    6/2014   Venugopal et al.

OTHER PUBLICATIONS

Agrawal, et al., "Mining videos from the web for electronic textbooks", In TechReport of MSR-TR-2014-5, Jan. 2014, 11 pages.

Agrawal, et al., "Enriching textbooks with images", In International Conference on Information and Knowledge Management, Oct. 24, 2011, 10 pages.

Agrawal, et al., "Enriching textbooks through data mining", In Proceedings of ACM Symposium on Computing for Development (ACM DEV), Dec. 10, 2010, 9 pages.

Yang, et al., "Query by Document", In Proceedings of the Second ACM International Conference on Web Search and Data Mining, Feb. 9, 2009, 10 pages.

Agrawal, et al., "Diversifying search results", In International Conference on Web Search and Data Mining (WSDM), Feb. 2009, 10 pages.

Baluja, et al., "Video suggestion and discovery for YouTube: Taking random walks through the view graph", In Proceedings of the 17th international conference on World Wide Web, Apr. 21, 2008, 10 pages.

Barbe, et al., "Teaching through modality strengths: Concepts and practices", Published on: Jun. 1979, Available at: http://www.amazon.com/Teaching-Through-Modality-Strengths-Practices/dp/0883091003.

Carbonell, et al., "The use of MMR, diversity-based reranking for reordering documents and producing summaries", In Proceedings of the 21st annual international ACM SIGIR conference on Research and development in information retrieval, Aug. 1, 1998, 2 pages.

Chen, et al., "Less is more: Probabilistic models for retrieving fewer relevant documents", In Proceedings of the 29th annual international ACM SIGIR conference on Research and development in information retrieval, Aug. 6, 2006, 8 pages.

Claxton, et al., "Learning styles: Implications for improving educational practices", Published on: May 14, 1987, Available at: http://www.amazon.com/Learning-Styles-Implications-Improving-Educational/dp/091331739X.

Dunn, et al., "Survey of research on learning styles", In Proceedings of Educational Leadership, Mar. 1989, 10 pages.

Gabrilovich, et al., "Computing semantic relatedness using Wikipedia-based explicit semantic analysis", In Proceedings of the 20th international joint conference on Artifical Intelligence, Jan. 6, 2007, 6 pages.

Gao, et al., "Clip Based Video Summarization and Ranking", In Proceedings of the International Conference on Content-based Image and Video Retrieval, Jul. 7, 2008, pp. 135-140.

John, et al., "Opportunity to Learn: A High Impact Strategy for Improving Educational Outcomes in Developing Countries", In Proceedings of USAID Educational Quality Improvement Program, Jul. 14, 2014, 24 pages.

Gollapudi, et al., "An Axiomatic Approach for Result Diversification", In Proceedings of the 18th International Conference on World Wide Web, Apr. 20, 2009, pp. 381-390.

Honey, et al., "The Manual of Learning Styles", In Peter Honey Publications, Jan. 31, 1992, 3 pages.

Hsu, et al., "Video Search Reranking via Information Bottleneck Principle", In Proceedings of the 14th Annual ACM International Conference on Multimedia, Oct. 23, 2006, 10 pages.

Hsu, et al., "Video Search Reranking Through Random Walk Over Document-Level Context Graph", In Proceedings of the 15th International Conference on Multimedia, Sep. 23, 2007, 10 pages.

Huston, et al., "Evaluating Verbose Query Processing Techniques", In Proceedings of the 33rd International ACM SIGIR Conference on Research and Development in Information Retrieval, Jul. 19, 2010, pp. 291-298.

Kumaran, et al., "Reducing Long Queries Using Query Quality Predictors", In Proceedings of the 32nd International ACM SIGIR Conference on Research and Development in Information Retrieval, Jul. 19, 2009, 8 pages.

Levenshtein, V.I., "Binary Codes Capable of Correcting Deletions, Insertions and Reversals", In Proceedings of Soviet Physics Doklady, vol. 10, No. 8, Feb. 1966, pp. 707-710.

Liu, et al., "Video Search Re-ranking via Multi-Graph Propagation", In Proceedings of the 15th International Conference on Multimedia, Sep. 23, 2007, 208-217.

Mariooryad, et al., "Automatic Characterization of Speaking Styles in Educational Videos", In Proceedings of International Conference on Acoustics, Speech and Signal Processing, May, 2014, 5 pages.

Medelyan, et al., "Mining Meaning from Wikipedia", In International Journal of Human-Computer Studies, vol. 67, Issue 9, Sep. 2009, 76 pages.

Meeker, et al., "Internet Trends", May 29, 2013 Available at: http://www.kpcb.com/insights/2013-internet-trends.

Miller, Michael V., "Integrating Online Multimedia into College Course and Classroom: With Application to the Social Sciences", In Journal of Online Learning and Teaching, vol. 5, No. 2, Jun. 2009, 29 pages.

Moulton, Jeanne, "How Do Teachers Use Textbooks and Other Print Materials: A Review of the Literature", In Proceedings of the Improving Educational Quality Project, Sep. 1994, 42 pages.

Nemhauser, et al., "An Analysis of Approximations for Maximizing Submodular Set Functions-I", In Proceedings of Mathematical Programming, vol. 14, Jul. 14, 2014, pp. 265-294.

Pinson, et al., "A New Standardized Method for Objectively Measuring Video Quality", In IEEE Transactions on Broadcasting, vol. 50, Issue 3, Sep. 2004, pp. 312-322.

Schmeck, R., "Learning Strategies and Learning Styles", In Publication of Plenum Press, Jul. 14, 2014, 1 page.

Speck, et al., "Collaborative Writing: An Annotated Bibliography", In Publication of Greenwood Press, Jul. 14, 2014, 4 pages.

Strube, et al., "WikiRelate! Computing Semantic Relatedness using Wikipedia", In Proceedings of the 21st National Conference on Artificial Intelligence, vol. 2, Jul. 16, 2006, 6 pages.

Tantrarungroj, Pornsook, "Effect of Embedded Streaming Video Strategy in an Online Learning Environment on the Learning of Neuroscience", In Phd Thesis, Jun. 2008, 3 pages.

Tarver, et al., "Modality Preference and the Teaching of Reading: A Review", In Journal of Learning Disabilities, vol. 11, Issue 1, Jan. 1978, 1 page.

Vee, et al., "Efficient Computation of Diverse Query Results", In IEEE 24th International Conference on Data Engineering, Apr. 7, 2008, 9 pages.

Verspoor, et al., "Textbooks and Educational Development", In International Bank for Reconstruction and Development/The World Bank, Dec. 1990, 34 pages.

Yang, et al., "Query by Document", In Proceedings of the Second ACM International Conference on Web Search and Data Mining, Feb. 9, 2009, pp. 34-43.

\* cited by examiner

ASSOCIATING CONTENT ITEMS WITH DOCUMENT SECTIONS

BACKGROUND

The proliferation of cloud-connected electronic devices has enabled the widespread availability of documents, such as books, in electronic format. In addition, these devices have also allowed users to access a variety of content items, such as videos on a variety of subjects.

However, despite the wide spread availability of content items on a variety of subjects, many of these electronic documents are just digital versions of the corresponding printed document and do not incorporate any of the available content items. For example, e-books typically do not include any more content than their printed counterparts.

Incorporating content items into the electronic documents may be particularly useful for electronic textbooks. Research has shown that students comprehend lessons better when the information is presented in a variety of different formats. For example, a user who reads a textbook chapter on a subject may recall more of the information presented in the chapter when it is followed or proceeded by a video that repeats some or all of the information presented in the chapter.

However, determining which content items to associate with a document is time consuming. For example, a user may have to both read the textbook and later view candidate content items to determine which content items are germane to a particular document or sections of the document. The user may then further have to determine an optimal location to place the content item in the document.

SUMMARY

A document such as a book or a textbook includes multiple sections such as chapters. Concept phrases are determined for each of the sections based on the text of each section. A set of content items such as videos is received, and each content item is associated with one or more queries that were submitted by users who were provided the content item in a set of search results. These queries are processed to determine concept phrases that are associated with the content items. The content items and their associated concept phrases are compared with the concept phrases associated with the sections to determine, for some or all of the content items, a minimum subset of the sections whose associated concept phrases cover most of the concept phrases that are associated with the content item. The content items are then inserted, or linked, with the sections in their corresponding minimum subsets.

In an implementation, a plurality of sections of a document is received by a computing device. Each section is associated with a plurality of concept phrases. A plurality of content items is received by the computing device. Each content item is associated with a plurality of concept phrases. For each content item, a subset of the sections that covers the content item is selected based on the concept phrases associated with the content item and the concept phrases associated with each section by the computing device. For at least one of the content items, the content item is associated with the selected subset of sections of the document by the computing device.

In an implementation, a document is received by a computing device. The document includes sections. Each section is associated with concept phrases. Content items are received by the computing device. Each content item is associated with queries. For each content item, concept phrases are associated with the content item based on the queries associated with the content item by the computing device. For each concept phrase associated with each section, a concept phrase score is determined by the computing device for the concept phrase associated with the section based on the concept phrases associated with each content item. For each concept phrase associated with each section, a content item score is determined by the computing device for each content item with respect to the concept phrase associated with the section based on the queries associated with the content item. For at least one content item, a subset of the sections that covers the at least one content item is selected by the computing device based on the concept phrase scores and the content item scores.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
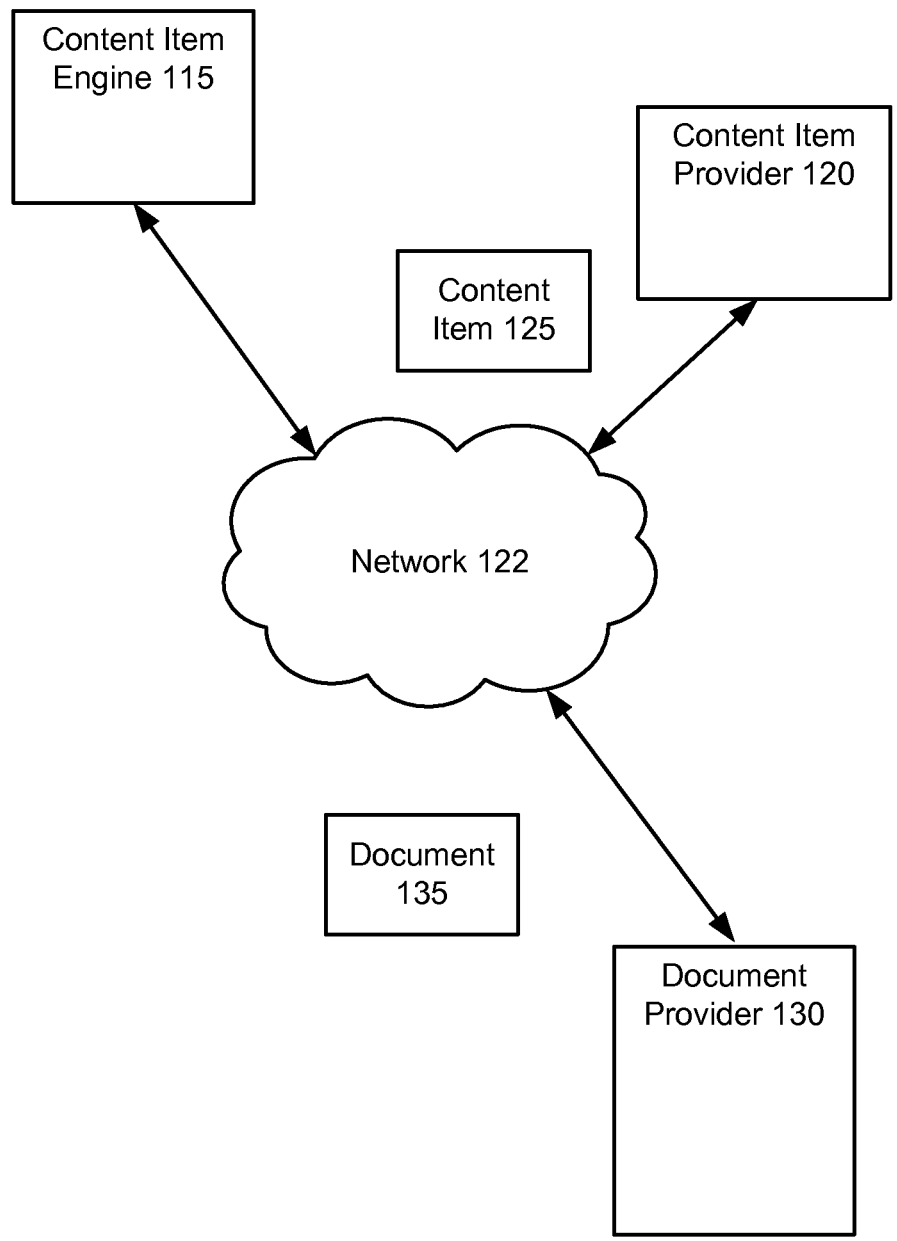
FIG. 1 is an illustration of an exemplary environment for associating content items with sections of a document.

FIG. 1 is an illustration of an exemplary environment 100 for associating content items with sections of a document. The environment 100 may include a content item engine 115, a content item provider 120, and a document provider 130 in communication through a network 122. The network 122 may be a variety of network types including the public switched telephone network (PSTN), a cellular telephone network, and a packet switched network (e.g., the Internet). Although only one content item engine 115, one content item provider 120, and one document provider 130 are shown in FIG. 1, there is no limit to the number of content item engines 115, content item providers 120, and document providers 130 that may be supported.

The document provider 130 may provide and/or generate one or more documents 135. A document 135 may be a digital or electronic document and may include a variety of document types including, but not limited to books, textbooks, pamphlets, thesis papers, research papers, dictionaries, blogs, journals, and encyclopedias, for example. Any type of document may be supported. The document 135 may be stored and distributed in a variety of formats including, but not limited to, PDF, HTML, XML, e-pub, etc. Other formats may be used.

Each document 135 may be divided into one or more sections. Depending on the implementation, the sections may include chapters, pages, paragraphs, or even sentences. The sections of a document 135 may be uniform in size, or may be different sizes.

In some implementations, the sections of a document 135 may have been determined by an author or publisher associated with the document 135. For example, an author may demarcate the start or end of each section of a document 135 using a pointer or special symbol. Alternatively, the document provider 130 may determine the sections of the document 135 by processing the document 135 to locate headings that may indicate the beginning or end of a section.

A content item provider 120 may provide and/or generate one or more content items 125. The content items 125 may include a variety of multimedia types including video content items, audio content items, or image content items. In addition, the content items 125 may be other documents such as webpages or web-based animations. Any type of content item may be supported.

In some implementations, the content item provider 120 may comprise a search engine and may receive queries for one or more content items 125, and may identify content items 125 that are relevant to the received queries. The content item provider 120 may record the received queries along with the content items 125 that were identified in response to the queries. In addition, the content item provider 120 may record the content item 125 that was ultimately selected or viewed by a user that provided the query.

Each content item 125 may further comprise metadata. The metadata associated with a content item 125 may include, but is not limited to, a title of the content item 125, one or more topics that the content item 125 purports to cover, reviews of the content item 125, transcripts or subtitle data associated with the content item 125, and a length of the content item 125. Other types of metadata may be supported. The metadata associated with a content item 125 may have been provided by an author or publisher of the content item, provided by one or more viewers of the content item, or may have been generated automatically for the content item by a computer, for example.

One drawback associated with a document 135 is that it may be difficult to determine which content items 125 to associate with the document 135, as well as which sections of the document 135 are the optimal sections for the content items 125 to be associated with. Accordingly, the environment 100 may further include a content item engine 115. The content item engine 115 may receive a document 135 along with a set of content items 125. The content item engine 115 may determine, for some or all of the received content items 125, a set of sections of the document 135 that cover, or mostly cover, the same subjects or topics as the content item 125. For example, a video content item 125 that is about the topics of right triangles and isosceles triangles may be covered by a chapter of a geometry textbook dealing with right triangles, and a chapter of a geometry textbook dealing with isosceles triangles.

In some implementations, the content item engine 115 may determine for a content item 125, the smallest or minimum set of sections that cover the content item 125. The content item engine 115 may determine the minimum set of sections using a greedy algorithm, or a brute force algorithm, for example. Implementations that describe how the content item engine 115 determines the sections that are covered by a content item 125 are described further with respect to FIG. 2.

After determining the sections of the document 135 that cover a particular content item 125, the content item engine 115 may associate the content item 125 with the determined sections of the document 135. For example, the content item engine 115 may insert links to the content item 125 in the determined sections of the document 135 (i.e., URLs), or may embed the content item 125 into the determined sections of the document 135. The content item engine 115 may also present the content item 125 next to some or all of the determined sections, or may present the content item 125 at the end of some or all of the determined sections.

Figure 2:
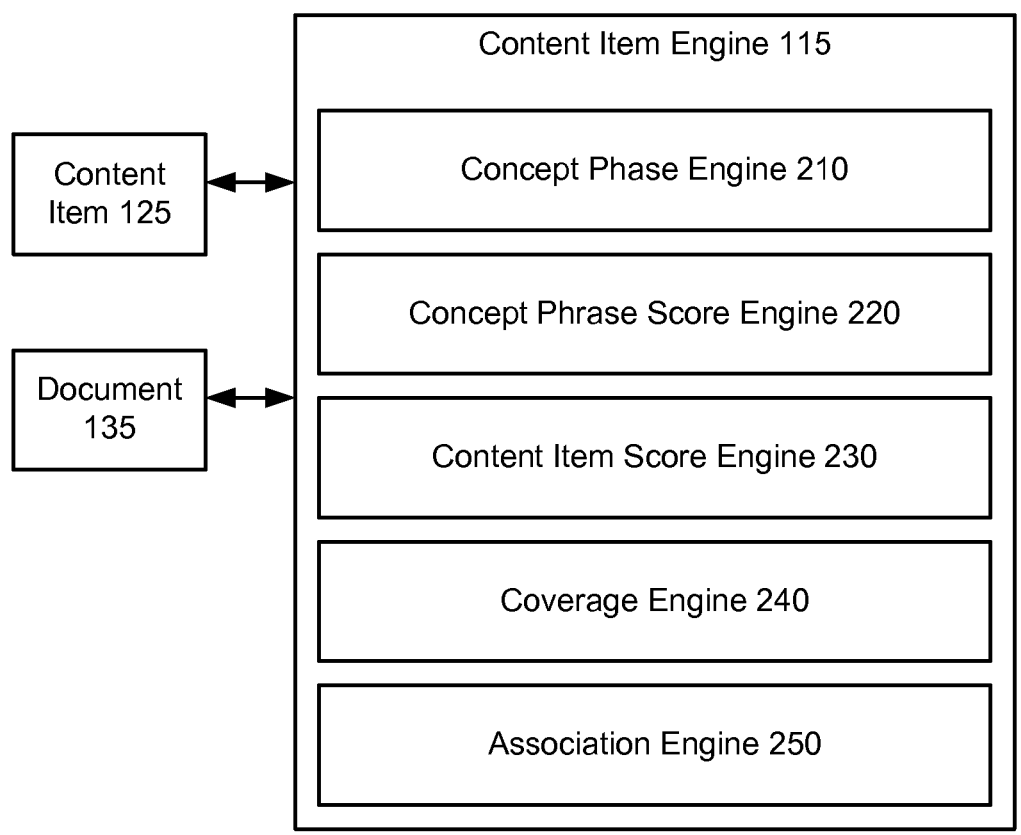
FIG. 2 is an illustration of an implementation of an exemplary content item engine.

FIG. 2 is an illustration of an implementation of an exemplary content item engine 115. The content item engine 115 may comprise one or more components including a concept phrase engine 210, a concept phrase score engine 220, a content item score engine 230, a coverage engine 240, and an association engine 250. More or fewer components may be included in the content item engine 115. Some or all of the components of the content item engine 115 may be implemented by one or more computing devices such as the computing device 500 described with respect to FIG. 5.

The concept phrase engine 210 may determine one or more concept phrases that are associated with each section of a document 135. Each concept phrase may be one or more words and may relate to the topic or subject of the section. Depending on the implementation, the concept phrase engine 210 may determine the concept phrases for a section by parsing the section into a plurality of words and phrases. Any one of a variety of text parsing methods or techniques may be used.

The concept phrase engine 210 may compare the plurality of words and phrases that result from the parsing of the section to a plurality of known concept phrases. These known concept phrases may be taken from a source such as an online or digital encyclopedia. For example, each of the known concept phrase may be a heading or article title from an online encyclopedia. Other sources of concept phrases may be used.

The concept phrase engine 210 may determine the plurality of words and phrases of the sections that match, or partially match, a word or phrase from the known concept phrases, and may associate the matching words or phrases with the section as the concept phrases. Other methods for associating concept phrases with a section of a document 135 may be used.

The concept phrase engine 210 may also determine one or more concept phrases that are associated with a content item 125. In some implementations, the concept phrase engine 210 may determine the concept phrases based on queries associated with each content item 125. For example, the queries associated with a content item 125 may be those queries that the content item 125 was provided in response to by the content item provider 120. Alternatively or additionally, the queries associated with a content item 125 may be limited to the queries where the content item 125 was provided as a "top result" (e.g., within the first five, ten, or twenty slots, in a results set), or those queries that resulted in a user selecting or viewing the content item 125. Depending on the implementation, the concept phrases determined for the content items 125 may be limited to those concept phrases that are already associated with a section of the document 135.

Moreover, the concept phrase engine 210 may determine the one or more concept phrases using metadata associated with each content item 125. The metadata may include the title of the content item 125, and transcripts, subtitles, or close caption information associated with the content item 125. Other types of metadata may be supported.

Similar to the sections of the document 135, the concept phrase engine 210 may determine the concept phrases associated with a content item 125 by determining words or phrases from the queries (and/or metadata) associated with the content item 125 with the set of known concept phrases. The known concept phrases that match, or partially match, words or phrases from the queries (and/or metadata) associated with the content item 125 may be associated with the content item 125.

The concept phrase score engine 220 may determine a concept phrase score for each concept phrase associated with a section of a document 135. The concept phrase score for a concept phrase may be a measure of the "importance" of the concept phrase with respect to the section of the document 135. In general, a concept phrase may be important to the section of the document 135 if the content items 125 that are associated with queries that match the concept phrase are strongly related to one another. Similarly, a concept phrase may not be important to the section of the document 135 if the content items 125 that are associated with queries that match the concept phrase are weakly related to one another.

Accordingly, in some implementations, the concept phrase score engine 220 may determine a concept phrase score for a concept phrase associated with a section by determining the content items 125 that are associated with a concept phrase that is a match, or is a partial match, of the concept phrase under consideration. Any technique for matching queries and concept phrases may be used.

The concept phrase score engine 220 may, for each of the determined content items 125, determine how related the content items 125 are to one another. In some implementations, the concept phrase score engine 220 may be determine the relatedness of two content items 125 by determining the number of associated concept phrases that each of the two content items 125 have in common. The average determined number across all of the pairs of the determined content items 125 may be associated with the concept phrase as the concept phrase score by the concept phrase score engine 220.

Other methods for determining the relatedness of content items 125 may be used by the concept phrase score engine 220. Information from the metadata such the title or author of the content item 125 may be considered. For example, content items by the same author or having a similar title may be determined to be related.

In some implementations, the concept phrase score engine 220 may cluster the concept phrases for each section based on the content item scores. Each cluster may include a different range of concept phrase scores. The concept phrases may be compared based on their associated cluster. Any method for clustering may be used.

The content item score engine 230 may determine a content item score for each content item 125 with respect to each of the concept phrases determined for each section of the document 135. The content item score determined for a content item 125 with respect to a concept phrase may be a measure of the importance of the content item 125 with respect to the concept phrase. The content item score for a content item 125 and a concept phrase associated with a section may be determined by the content item score engine 230 based on the queries associated with each content item 125. In some implementations, the content item score may be determined based on a percentage or fraction of a total number of queries that are associated with a content item 125 that match, or partially match, the concept phrase associated with the section of the document 135.

The coverage engine 240 may determine, for each content item 125, a minimum subset of sections of the document 135 whose associated concept phrases best "cover" the associated concept phrases of the content item 125. A content item 125 is covered by a subset of sections if all of the concept phrases associated with the content item 125 are also associated with at least one section in the subset. Thus, the subset of sections that best covers a content item 125 is the subset that comes closest to having all of the concept phrases associated with the content item 125.

The coverage engine 240 may determine each subset by maximizing the following formula 1 where $F(v,T)$ is the subset of sections T associated with each content item 125, v, $cover(v,T)$ is an equation that determines how many of the concept phrases associated with a content item are covered by the subset of sections T, and $\lambda$ is a discount factor:

$$F(v,T) = cover(v,T) - \lambda |T| \qquad (1).$$

The discount factor $\lambda$ may be selected by a user or an administrator and acts as penalty for having too many sections in a subset T. Thus, the formula 1 provides a trade-off between the amount of coverage provided by the sections in a subset T with a desire to minimize the number of sections in each subset T.

In some implementations, the function $cover(v,T)$ may be calculated by the coverage engine 240 by determining a count or percentage of how many concept phrases of the content item v are matched by a concept phrase in any of the sections included in T.

Alternatively, the function $cover(v,T)$ may be weighted using some or both of the determined content item scores and concept phrase scores. In some implementations, the function $cover(v,T)$ may be weighted such that concept phrases associated with content items with high content item scores receive higher counts than concept phrases associated with the content items with low content item scores. In addition, concept phrases of each of the sections in T with high concept phrase scores may receive higher counts than concept phrases of each of the sections in T with low concept phrase scores.

The function $cover(v,T)$ may be implemented using the following formula 2 where $C(v)$ is the set of concept phrases associated with a content item v, $C(T)$ is all the concept phrases associated with a section in the subset T, $W_{vc}$ is the content item score for the content item v with respect to a concept phrase v, and $I(c)$ is the concept phrase score for the concept phrase C:

$$cover(v, T) = \frac{\sum_{c \in (C(v) \cap C(T))} W_{vc} I(c)}{\sum_{c \in (C(v))} W_{vc} I(c)}. \qquad (2)$$

The coverage engine 240 may determine the subset of sections that best covers each content item 125 by maximizing the formula 1 using a greedy algorithm. Alternatively, the coverage engine 240 may maximize the formula using a brute force algorithm. Other methods may be used.

The association engine 250 may associate the content items with one or more of the sections of the document 135 that each content item is covered by. In some implementations, a content item 125 may be associated with a section of a document 135 by inserting the content item 125 into the section. For example, where the content item is a video content item, the video may be embedded directly into the section. A user reading the section of the document may then view the video while reading the section by pressing a user interface element associated with playing the video.

Alternatively, the association engine 250 may associate a content item 125 with a section of a document by inserting a link to the content item into the section of the document. For example, where the content item 125 is an audio content item, a link to the audio (i.e., a URL) may be inserted into the text of the section. A user reading the section of the document 135 may choose to listen to the audio by selecting the inserted link.

Figure 3:
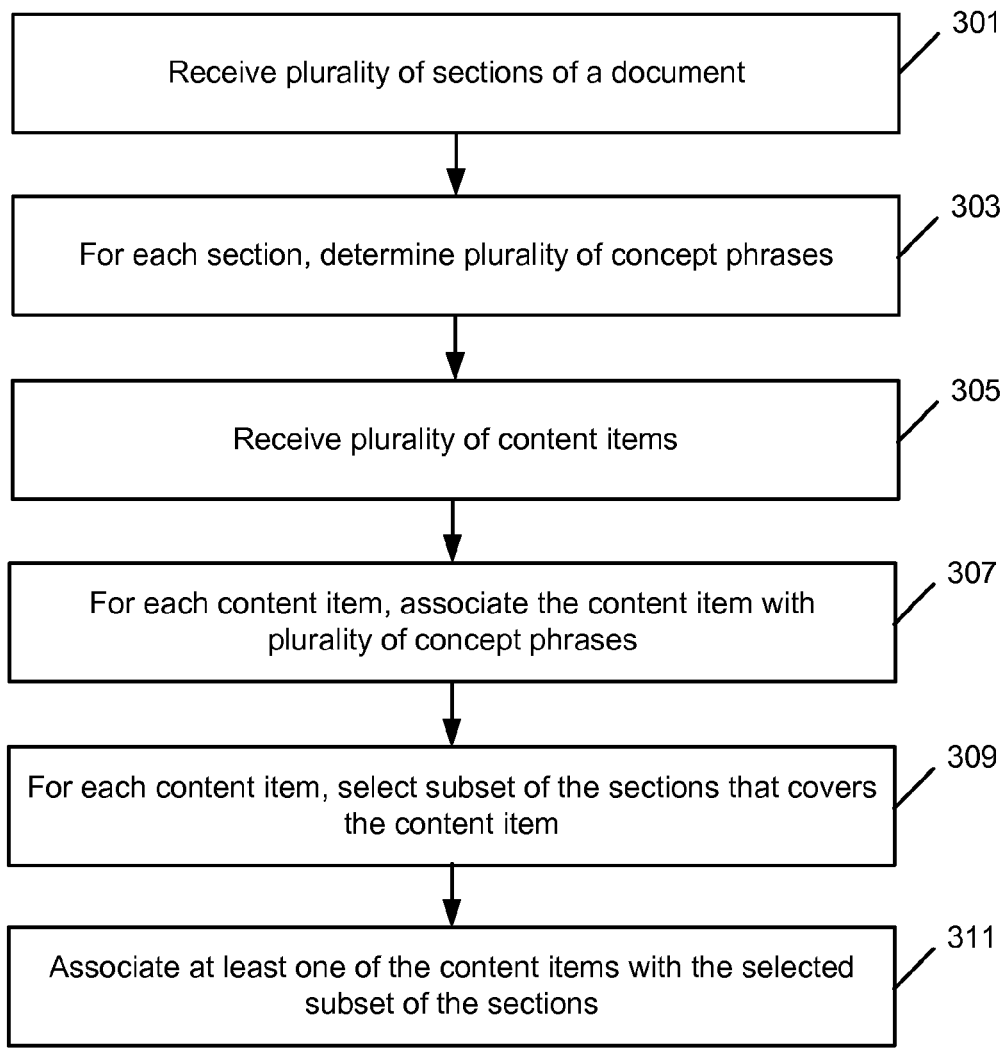
FIG. 3 is an illustration of an operational flow of a method for associating content items with sections of a document.

FIG. 3 is an illustration of an operational flow of a method 300 for associating content items 125 with sections of a document 135. The method 300 may be implemented by a content item engine 115, for example.

At 301, a plurality of sections of a document is received. The plurality of sections may be received by the content item engine 115. The document 135 may be an electronic or digital document and may include books, textbooks, e-books, and/or papers, for example. Each section may correspond to a chapter of the document 135, or some other portion of the document 135. Depending on the implementation, the sections of the document may be received, or may be determined automatically from the text of the document, for example.

At 303, a plurality of concept phrases is determined for each section. The plurality of concept phrases may be determined for a section by the concept phrase engine 210 of the content item engine 115. In some implementations, the concept phrases may be determined by the concept phrase engine 210 parsing the text of the section for words and phrases that match a list of known concept phrases. Each determined concept phrase may describe a subject or topic that is presumably associated with the section of the document 135.

At 305, a plurality of content items is received. The plurality of content items 125 may be received by the content item engine 115 from the content item provider 120. The content items 125 may include a variety of content types including videos, image files, audio files, and/or text files, for example. The content items 125 may be interactive and may include video games or interactive quizzes or surveys, for example.

At 307, for each content item, the content item is associated with a plurality of concept phrases. The content items 125 may be associated with concept phrases by the concept phrase engine 210 of the content item engine 115. In some implementations, the concept phrase engine 210 may determine content phases associated with a content item 125 by comparing queries received for the content item with the list of known concept phrases. The concept phrases that match, or partially match, queries associated with the content item 125 may then be determined to be associated with the content item 125 by the concept phrase engine 210.

At 309, for each content item, a subset of the sections that covers the content item is selected. The subset may be determined by the coverage engine 240 of the content item engine 115. The coverage of a subset of sections with respect to a content item 125 may be determined based on the number of concept phrases that are associated with the content item 125, that are also associated with at least one of the sections in the subset of sections. In some implementations, the subset with the highest determined coverage is selected as the subset of sections that covers the content item 125.

The selected subset that covers a content item 125 may be a minimum subset (i.e., has the fewest sections) of all subsets that cover the content item 125. The subset may be selected for each content item using one or more of a greedy algorithm or a brute force algorithm. Depending on the implementation, the coverage of a particular subset may be weighted based on the relative importance of each concept phrase to the sections and to the content items (e.g., the concept phrase scores and content items scores).

At 311, at least one of the content items is associated with the sections of the selected subset of sections. The at least one content item may be associated the sections of the selected subset of sections by the association engine 250 of the content item engine 115. Depending on the implementation, a content item 125 may be associated with a section of a document 135 by either inserting the content item into the section of the document or inserting a link to the content item into the section of the document.

Figure 4:
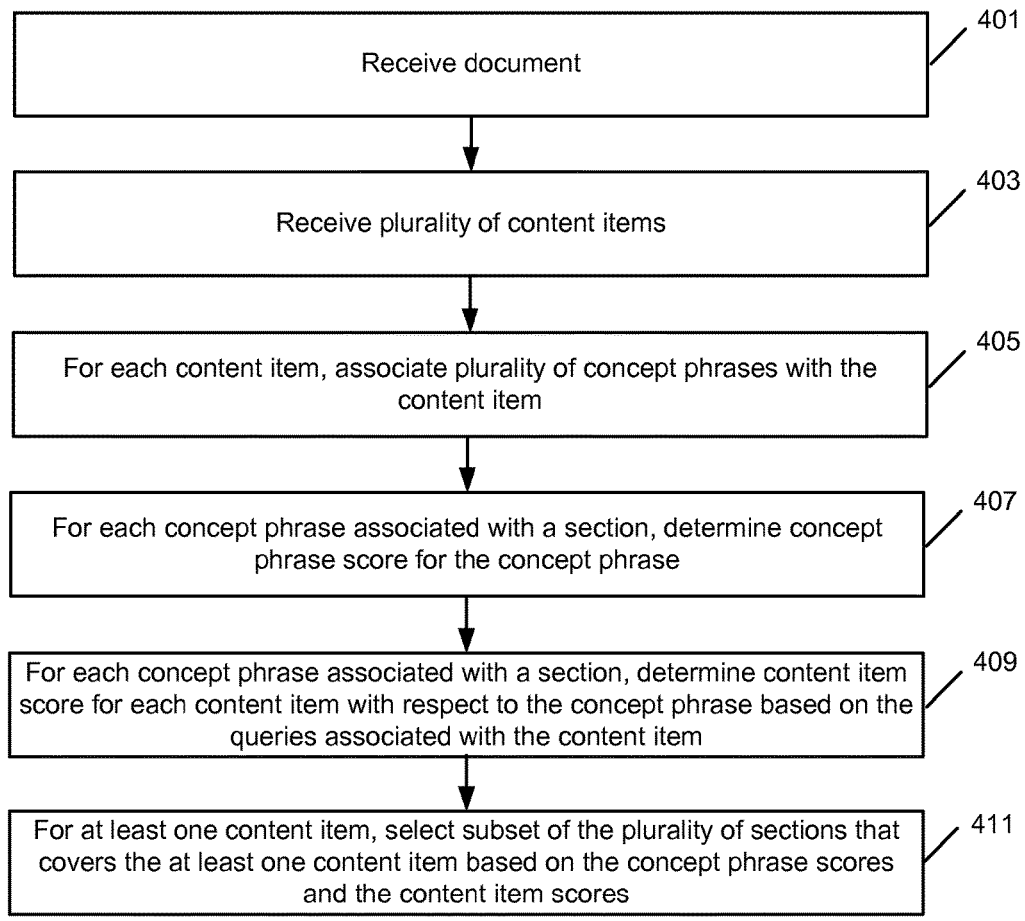
FIG. 4 is an illustration of an operational flow of a method for determining subsets of sections of a document that are covered by a content item.

FIG. 4 is an illustration of an operational flow of a method 400 for determining subsets of sections of a document that are covered by a content item 125. The method 400 may be implemented by a content item engine 115.

At 401, a document is received. The document 135 may be received content item engine 115 from a document provider 130. The document 135 may be an electronic or digital document. The document 135 may include a plurality of sections. Each section may correspond to a chapter of the document, or some other portion of the document.

Each section of the document 135 may be associated with one or more concept phrases. In some implementations, the concept phrases associated with a section may be determined by the concept phrase engine 210 parsing the text of the section for words and phrases that match a list of known concept phrases. Each determined concept phrase may describe a subject or topic that is presumably associated with the section of the document 135.

At 403, a plurality of content items is received. The plurality of content items 125 may be received by the content item engine 115 from the content item provider 120. The content items 125 may include a variety of content types including videos, image files, audio files, and/or text files, for example. The content items 125 may be known to be related to one or more sections of the document 135. The content items 125 may have been selected by a user, or by the content item engine 115 based on the concept phrases associated with the sections of the document 135.

Each content item 125 may be associated with a plurality of queries. A query associated with a content item may be a query that was received by the content item provider 120 where the associated content item was provided in response to the query. For example, the content item may have been provided in a generated results set. Depending on the implementation, the associated queries may be queries where the associated content item was a highly ranked content item (e.g., top ten), or queries where the associated content item was selected or viewed by a user associated with the query.

At 405, for each content item, a plurality of concept phrases is associated with the content item. The concept phrases may be associated with a content Item 125 by the concept phrase engine 210 based on the queries associated with the content item. For example, the concept phrase engine 210 may match known concept phrases with the queries associated with each content item. Depending on the implementation, the concept phrases associated with each content item may be limited to those concept phrases that were associated with the sections of the document 135.

At 407, for each concept phrase associated with a section, a concept phrase score is determined for the concept phrase. The concept phrase score may be determined by the concept phrase score engine 220. The concept phrase score may reflect the importance of the concept phrase with respect to the section of the document 135.

Depending on the implementation, the concept phrase score engine 220 may determine a concept phrase score for a concept phrase by determining content items of the plurality of content items 125 whose associated plurality of concept phrases includes a concept phrase that matches the concept phrase. Of the determined content items, the concept phrase score engine 220 may determine how similar each of the content items are based on their associated concept phrases. Depending on the implementation, a first content item may be similar to a second content item if it has associated concept phrases in common. Accordingly, the concept phrase score engine 220 may determine an average number of concept phrases that each of the determined content items have in common with each other, and may determine the concept phrase score based on the average number. Other methods may be used.

At 409, for each concept phrase associated with each section, a content item score is determined for each content item with respect to the concept phrase associated with the section based on the queries associated with the content item. The content items scores may be determined by the content item score engine 230 of the content item engine 115.

Depending on the implementation, the content item score engine 230 may determine a content item score for a content item 125 with respect to the concept phrase associated with the section by determining a percentage of the queries associated with the content item that are a match of the concept phrase associated with the section. The content item score may be determined based on the percentage. As may be appreciated, the more queries that were received for a content item that include or match a particular concept phrase, the more likely that concept phrase is important to the content item.

Alternatively or additionally, metadata associated with the content item may also be used to determine the content item score for a content item with respect to a concept phrase. For example, if the concept phrase appears in a transcript or close captioning data associated with the content item, the title of the content item, or one or more links to the content item, the content item score engine 230 may increase the determined content item score with respect to the concept phrase.

At 411, for at least one content item, a subset of the plurality of sections that covers the at least one content item is selected based on the concept phrase scores and the content items scores. The subset that covers the at least one content item based on the concept phrase scores and the content items scores may be selected by the coverage engine 240 of the content item engine 115.

The subset that covers the at least one content item may be the subset of sections that includes sections with associated concept phrases that matches the greatest number of the concept phrases associated with the at least one content item. Thus, the subset of sections selected by the coverage engine 240 may be the subset of sections having the highest number matching concept phrases. In some implementations, the subset may be the minimum sized subset with the highest number of matching concept phrases and may be selected by the coverage engine 240 using a greedy or brute force heuristic. In addition, the number of matching phrases for a subset may be weighted based on the concept phrase scores and the content items scores associated with the matching concept phrases and the at least one content item.

Figure 5:
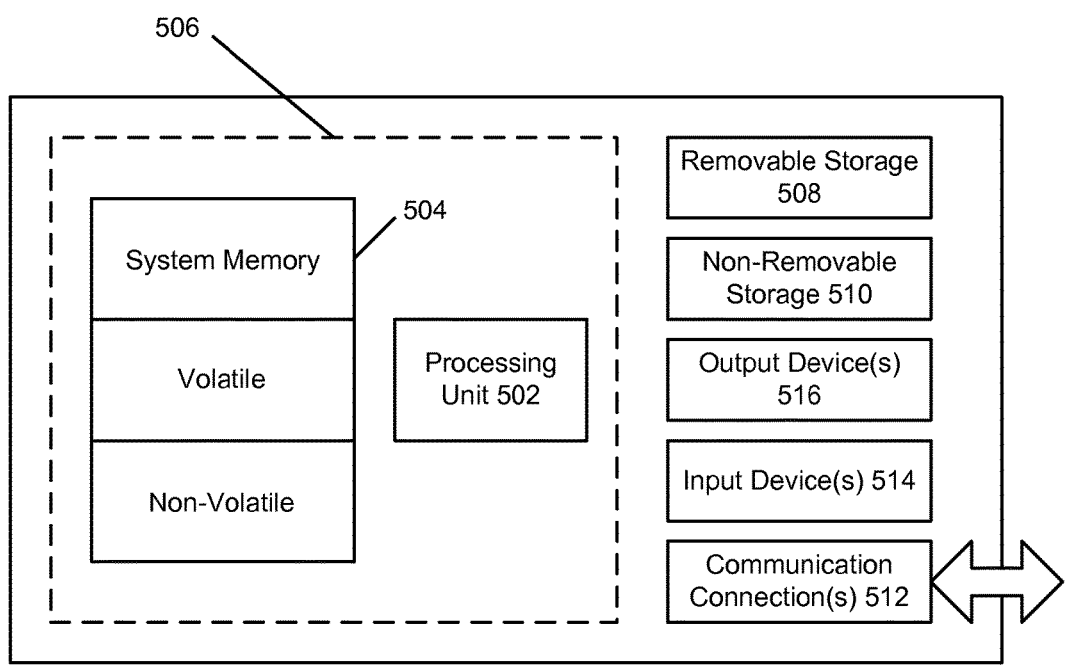
FIG. 5 shows an exemplary computing environment in which example embodiments and aspects may be implemented.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
receiving, via a computer system, a plurality of computer-readable sections of a document, wherein each section is associated with a first plurality of concept phrases;
receiving, via the computer system, a plurality of computer-readable content items, wherein each content item is associated with a plurality of queries, wherein each of the plurality of queries were previously submitted by at least one user and wherein the plurality of content items were provided in a set of search results generated in response to the plurality of queries previously submitted by at least one user;
for each content item, associating, via the computer system, the content item with a second plurality of concept phrases, wherein the second plurality of concept phrases is based on the queries previously submitted by the at least one user that the content item was provided in response to;
for each content item of the plurality of content items, selecting, via the computer system, a subset of the sections that covers the content item based on the subset of the sections being associated in the computer system with one or more of the first plurality of concept phrases and the content item being associated in the computer system with one or more of the second plurality of concept phrases, with the selection of the subset of the sections comprising a trade-off between increasing coverage of the content item by the subset and decreasing numbers of sections in the subset, with the trade-off comprising:
favoring selection of sections that increase coverage of the content item by the subset, with the coverage of the content item being increased by selection of sections that are associated with concept phrases of the first plurality of concept phrases that match a greater number of concept phrases of the second plurality of concept phrases with which the content item is associated; and
penalizing selection of greater numbers of sections for inclusion in the subset; and
for at least one of the content items, generating, via the computer system, one or more computer-readable associations, with the one or more computer-readable associations associating the at least one content item with the selected subset of sections of the document, and with the generating of the one or more computer-readable associations using results of the selecting of the subset of the sections.

2. The method of claim 1, wherein the content items comprise one or more of video content items, audio content items, or text content items.

3. The method of claim 1, wherein the document is a book, and each section is a chapter of the book.

4. The method of claim 1, wherein the selected subset is a minimum subset and is selected using one or more of a greedy algorithm and a brute force algorithm.

5. The method of claim 1, wherein associating the content item with the selected subset of sections of the document comprises one or more of inserting the content item into at least one of the sections of the selected subset of sections, inserting a link to the content item into at least one of the sections of the selected subset of sections, presenting the content item next to at least one of the selected subset of sections, or presenting the content item at an end of at least one of the selected subset of sections.

6. The method of claim 1, wherein the second plurality of concept phrases is determined based on at least partially matching the phrases from the queries previously submitted by the at least one user that the content item was provided in response to.

7. The method of claim 1, wherein the phrases from the queries previously submitted by the at least one user that the content item was provided in response to comprise at least one single-word phrase.

8. The method of claim 1, wherein the selecting the subset of the sections that covers the content item is based on matching one or more phrases from the first plurality of concept phrases with one or more phrases from the second plurality of concept phrases.

9. The method of claim 1, wherein, for one or more of the content items, the second plurality of concept phrases is determined based on metadata associated with the content item and on the phrases from the queries previously submitted by the at least one user that the content item was provided in response to.

10. The method of claim 1, wherein each of the first plurality of concept phrases relates to a topic or subject of a corresponding section that is associated with the concept phrase of the first plurality of concept phrases.

11. A computer system comprising:
   at least one processor; and
   memory comprising instructions stored thereon that when executed by at least one processor cause at least one processor to perform acts via a content item engine in the computer system, with the acts comprising:
      receiving a plurality of computer-readable sections of a digital document;
      for each section, determining a first plurality of concept phrases;
      receiving a plurality of computer-readable content items, wherein each content item is associated with a plurality of queries, wherein each of the plurality of queries were previously submitted by at least one user and wherein the plurality of content items were provided in a set of search results generated in response to the plurality of queries previously submitted by at least one user;
      for each content item, associating the content item with a second plurality of concept phrases, wherein the second plurality of concept phrases is based on the queries previously submitted by the at least one user that the content item was provided in response to;
      for each content item of the plurality of content items, selecting a subset of the sections that covers the content item based on the subset of the sections being associated in the computer system with one or more of the first plurality of concept phrases and the content item being associated in the computer system with one or more of the second plurality of concept phrases, with the selection of the subset of the sections comprising a trade-off between increasing coverage of the content item by the subset and decreasing numbers of sections in the subset, with the trade-off comprising:
         favoring selection of sections that increase coverage of the content item by the subset, with the coverage of the content item being increased by selection of sections that are associated with concept phrases of the first plurality of concept phrases that match a greater number of concept phrases of the second plurality of concept phrases with which the content item is associated; and
         penalizing selection of greater numbers of sections for inclusion in the subset; and
      for at least one of the content items, generating one or more computer-readable associations, with the one or more computer-readable associations associating the content item with the selected subset of sections of the document, and with the generating of the one or more computer-readable associations using results of the selecting of the subset of the sections.

12. The system of claim 11, wherein the content items are one or more of video content items, audio content items, or text content items.

13. The system of claim 11, wherein the document is a book, and each section is a chapter of the book.

14. The system of claim 11, wherein the selected subset is a minimum subset and is selected using one or more of a greedy algorithm and a brute force algorithm.

15. The system of claim 11, further comprising a content item server, and wherein the acts comprise the content item engine that receives the plurality of content items querying the content item server using one or more of the first plurality of concept phrases; and receiving the plurality of content items in response to the query.

16. One or more computer-readable memory having computer-executable instructions embodied thereon that, when executed by at least one processor, cause at least one processor to perform acts via a content item engine, with the acts comprising:
   receiving a plurality of computer-readable sections of a digital document;
   for each section, determining a first plurality of concept phrases;
   receiving a plurality of computer-readable content items, wherein each content item is associated with a plurality of queries, wherein each of the plurality of queries were previously submitted by at least one user and wherein the plurality of content items were provided in a set of search results generated in response to the plurality of queries previously submitted by at least one user;
   for each content item, associating the content item with a second plurality of concept phrases, wherein the second plurality of concept phrases is based on the queries previously submitted by the at least one user that the content item was provided in response to;
   for each content item of the plurality of content items, selecting a subset of the sections that covers the content item based on the subset of the sections being associated in a computer system with one or more of the first plurality of concept phrases and the content item being associated in the computer system with one or more of the second plurality of concept phrases, with the selection of the subset of the sections comprising a trade-off between increasing coverage of the content item by the subset and decreasing numbers of sections in the subset, with the trade-off comprising:
      favoring selection of sections that increase coverage of the content item by the subset, with the coverage of the content item being increased by selection of sections that are associated with concept phrases of the first plurality of concept phrases that match a greater number of concept phrases of the second plurality of concept phrases with which the content item is associated; and
      penalizing selection of greater numbers of sections for inclusion in the subset; and
   for at least one of the content items, generating one or more computer-readable associations, with the one or more computer-readable associations associating the content item with the selected subset of sections of the document, and with the generating of the one or more computer-readable associations using results of the selecting of the subset of the sections.

17. The one or more computer-readable memory of claim 16, wherein the content items are one or more of video content items, audio content items, or text content items.

18. The one or more computer-readable memory of claim 16, wherein the document is a book, and each section is a chapter of the book.

19. The one or more computer-readable memory of claim 16, wherein the selected subset is a minimum subset and is selected using one or more of a greedy algorithm and a brute force algorithm.

20. The one or more computer-readable memory of claim 16, wherein the acts further comprise querying a content item server using one or more of the first plurality of concept phrases; and receiving the plurality of content items in response to the query.

\* \* \* \* \*